March 8, 1932. G. A. LYON 1,849,013
COVER FOR SPARE TIRES OF AUTOMOBILES
Original Filed May 21, 1928 2 Sheets-Sheet 1
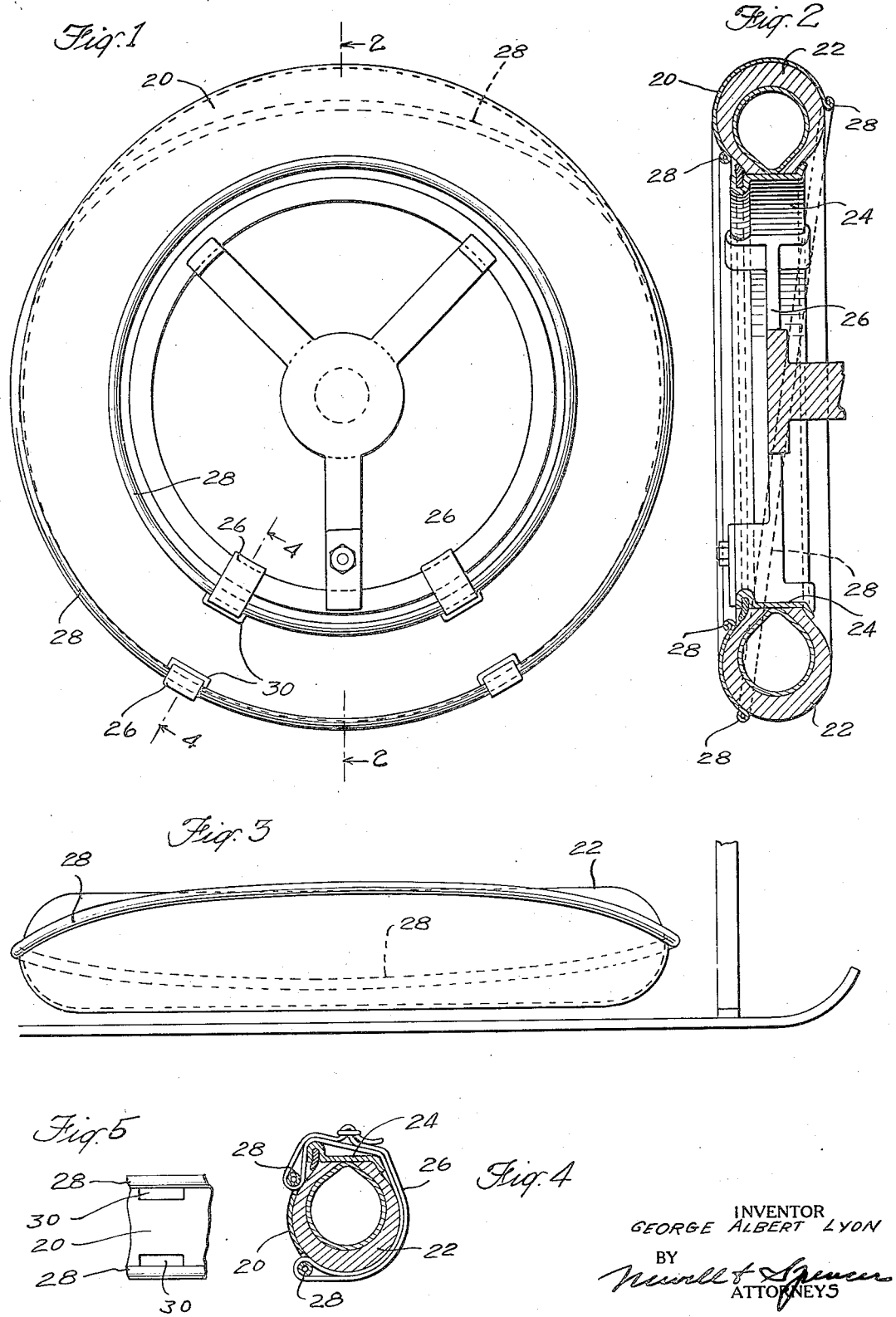
INVENTOR
GEORGE ALBERT LYON
BY
ATTORNEYS March 8, 1932. G. A. LYON 1,849,013
COVER FOR SPARE TIRES OF AUTOMOBILES
Original Filed May 21, 1928   2 Sheets-Sheet 2
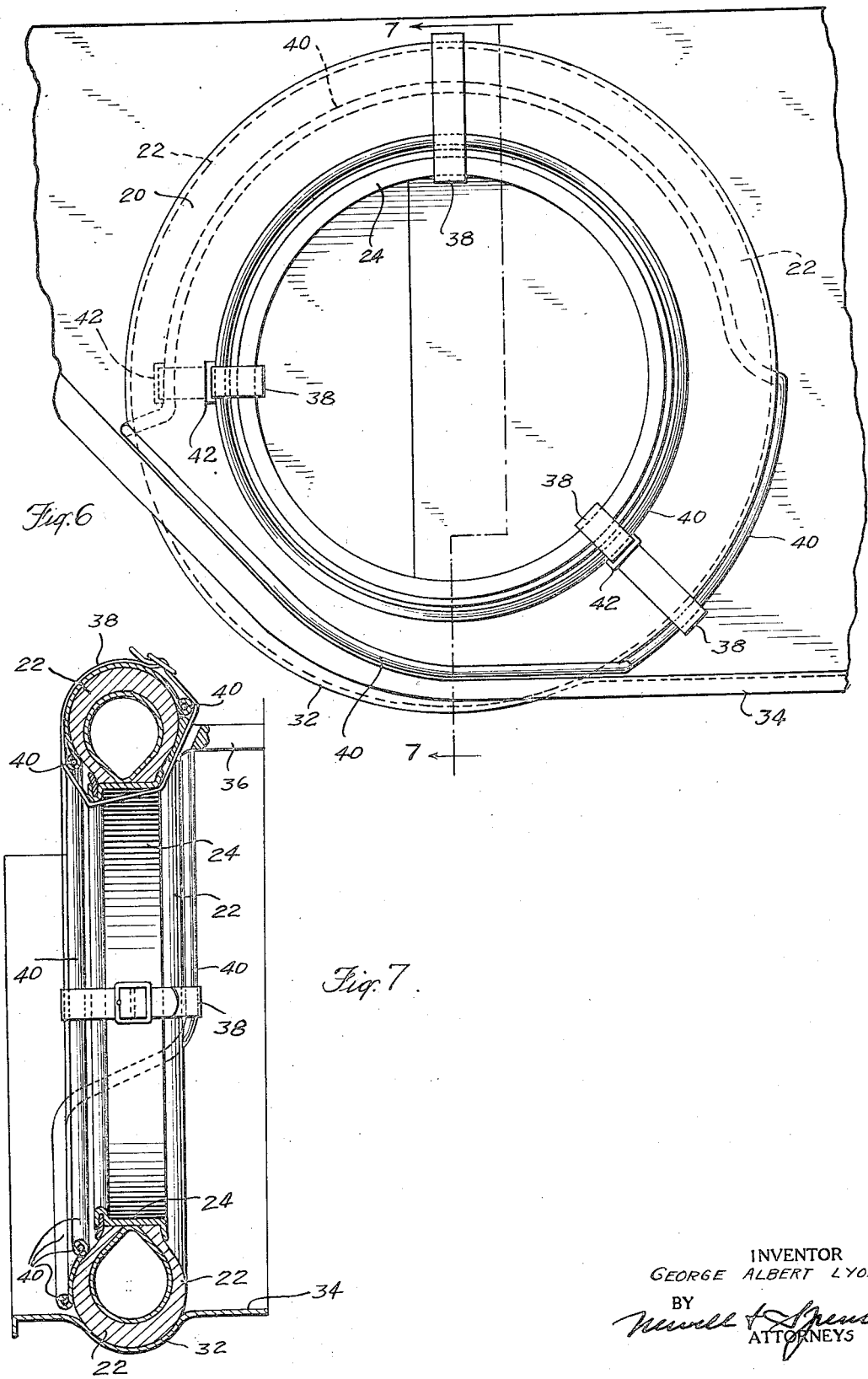
INVENTOR
GEORGE ALBERT LYON
BY
ATTORNEYS Patented Mar. 8, 1932

1,849,013

UNITED STATES PATENT OFFICE.

GEORGE ALBERT LYON, OF ALLENHURST, NEW JERSEY, ASSIGNOR TO LYON INCORPORATED, OF ASBURY PARK, NEW JERSEY, A CORPORATION OF DELAWARE

COVER FOR SPARE TIRES OF AUTOMOBILES

Original application filed May 21, 1928, Serial No. 279,292, and in Canada May 16, 1929. Divided and this application filed June 14, 1929. Serial No. 370,842.

This invention relates to covers for spare tires carried upon automobiles.

The usual spare tire cover consists of a canvas casing coated with waterproofing material and formed to fit the contour of the spare tire and carrier. These tire covers are unattractive in appearance and are subject to shrinkage so that they are difficult to apply to a tire after having been in use for a relatively short time. Such casings also often cannot be applied to a tire so that they will fit the tire smoothly. They also wear out quickly and are readily torn, particularly when struck by another car, as often happens under congested traffic conditions. They also do not constitute a satisfactory protection for the tire against damage in case of collision. The ordinary tire cover, since it is made of a highly flexible material, not only wrinkles readily but, when applied to a tire, conforms to the projections or roughnesses on the tire so that it does not present a smooth outer surface.

The principal object of the present invention is to produce a cover for the spare tire of an automobile which has a highly attractive appearance, which may be readily applied to the tire, which is strong and durable in construction, which will protect the tire in a reliable manner against weather and damage from collision, and which will present a smooth outer surface at all times.

With this and other objects in view, the invention comprises the novel and improved features, constructions and combinations of parts hereinafter described and particularly pointed out in the claims, the advantages of which will be readily understood and appreciated by those skilled in the art.

The present application constitutes a division of applicant's pending application Serial No. 279,292 filed May 21, 1928.

The invention will be clearly understood from the accompanying drawings illustrating the invention in its preferred form and the following detailed description of the constructions therein shown.

In the drawings—

Fig. 1 is a view in front elevation illustrating a tire cover embodying the invention applied to a tire;

Fig. 2 is a sectional view taken substantially on the line 2—2 of Fig. 1;

Fig. 3 is a plan view of the construction shown in Fig. 1 and also showing a bumper on the rear of a car to which the tire cover is applied;

Fig. 4 is a detail sectional view taken substantially on the line 4—4 of Fig. 1;

Fig. 5 is a detail view in front elevation illustrating a portion of the tire cover shown in Figs. 1 to 4 inclusive;

Fig. 6 is a view in front elevation illustrating another form of the invention; and Fig. 7 is a sectional view taken substantially on the line 7—7 of Fig. 6.

In the form of the invention illustrated in Figs. 1 to 5 inclusive, the tire cover 20 is especially constructed to be applied to a tire 22 mounted on a rim 24 supported on a tire carrier 26 at the rear of a car having a bumper located relatively close to the tire, as shown in Fig. 3. The tire cover is constructed so that in applying the same to the tire, the cover may be inserted from above through a limited space between the tire and the bumper. In the construction shown, the upper portion of the tire cover is shaped to cover one side of the tire and the peripheral portion thereof, and to overhang the tire upon the opposite side thereof. In order that the cover may be applied to the tire from above by inserting the same between the bumper and the tire, the cover is formed so that it gradually diminishes in lateral dimensions from the upper to the lower portion of the cover, as clearly shown in Fig. 2. With this construction the upper portion of the cover covers the exposed face of the tire, extends across the periphery, and overhangs the opposite face of the tire to maintain itself in position upon the tire when applied thereto. The lower portion of the cover is formed to extend only over the outer or exposed side of the tire, as shown in Fig. 2, and is provided with straps indicated at 26 for securing the same in position upon the tire.

The cover shown in Figs. 1 to 5 inclusive is provided with cylindrical beads 28 at its margins. The cover is formed with slots 30 for the passage of the straps 26 and the tire cover is secured to the tire by passing the straps through the slots 30, about the beads 28 and about the tire and rim and the ends of the straps are secured together in substantially the manner shown in Fig. 4.

In applying the tire cover to the tire, the lower or narrower portion of the cover is inserted between the bumper and the tire and the upper or wider portion of the cover is applied to the tire in substantially the manner illustrated in Figs. 2 and 3. The straps 26 are then secured in place to attach the cover to the tire.

In the form of the invention illustrated in Figs. 6 and 7, the tire cover is applied to the spare tire mounted upon the running board of a car. As shown in these figures, the lower portion of the tire is located in a recess 32 in the running board 34. The upper portion of the tire rests against a bracket 36 projecting from the side of the car.

In the construction shown in these figures the cover has substantially the same shape in cross section as the cover shown in Fig. 1, except that it is cut away where the tire enters the recess 32 in the running board and is shaped along its margin adjacent the running board to conform to the shape of the running board. The cover shown in these figures may be formed as a continuous ring in cases where it may be applied to the tire without expansion of the ring.

The tire cover shown in Figs. 6 and 7 is secured in position with relation to the tire by means of a series of straps indicated at 38. The cover is provided at its margins with cylindrical beads indicated at 40 and is formed with slots 42 adjacent the beads for the passage of the straps. The straps are passed about the beads of the cover and about the tire and rim and the ends of the straps are secured together in the manner shown particularly in Fig. 7, to secure the cover in place with relation to the tire.

The tire cover above described has the advantages that it is strong and durable in construction and that it will efficiently protect the tire both from the weather and from injury to which the tire may be subjected in case of collision by contact of another car with the tire. The cover being made of relatively stiff sheet material, will maintain its shape so that it will always present a smooth attractive outer surface. When made of sheet metal, the principal parts of the cover may be stamped out with suitable dies, thereby enabling the covers to be made in quantities at a relatively small cost. The cover may be enameled in any desired color, and when made of sheet metal, may be plated with nickel. A cover of the construction shown in the drawings of this application will be highly attractive in appearance and will add greatly to the beauty of the car. The cover in each case may be quickly and easily applied to the tire and as quickly and easily detached therefrom.

It is to be understood that the terms "ring", "annular", "ring-shaped", and similar terms employed in the specification and claims to define applicant's cover are not limited to a construction in which the cover or the portion or portions thereof defined by these terms have the form of a complete ring, but that these terms also apply to a construction in which the cover or the portion or portions thereof defined have the form of a portion of a ring only.

Having explained the nature and object of the invention and having specifically described a construction embodying the invention in its preferred form, what is claimed is:

1. A protective metallic cover for a spare tire on a vehicle comprising a circular plate for covering substantially the entire exposed outer side wall of the tire and a circular rim portion at the upper portion of the plate for covering only a part of the entire outer periphery of the tire and having its lower edges extending transversely and diagonally across the periphery of the tire from the rear side of the tire to the front side thereof, and thus terminating in said side plate.

2. A protective metallic cover for a spare tire on a vehicle comprising a circular plate for covering substantially the entire exposed outer side wall of the tire, a circular rim portion at the upper portion of the plate for covering only a part of the entire outer periphery of the tire and having its lower edges extending transversely and diagonally across the periphery of the tire from the rear side of the tire to the front side thereof, and thus terminating in said side plate, and means associated with said rim portion for retaining the cover in proper tire protecting position.

3. A protective metallic cover formed to be shoved downwardly onto a spare tire on a vehicle comprising a circular side plate portion for disposition over an outer side wall of a spare tire and an arcuate rim portion at the top of the plate portion for covering only a part of the entire outer periphery of the tire and having its lower edges extending transversely across the outer periphery of the tire from the rear side of the tire to the front side thereof and thus terminating in said side plate portion, said rim portion having its rear edge at the top of the cover extending inwardly from the outer periphery of the tire alongside the rear edge of the tire tread so as to overhang the tread of the tire and thus prevent lateral displacement of the cover on the tire.

4. A protective metallic cover formed to be shoved downwardly onto a spare tire on an automobile, comprising a circular side plate portion for disposition over an outer side wall of a spare tire and an arcuate rim portion at the top of the plate portion for covering only a part of the entire outer periphery of the tire and having its lower edges extending transversely across the outer periphery of the tire from the rear side of the tire to the front side thereof and thus terminating in said side plate portion, said rim portion having its rear edge at the top of the cover extending inwardly from the outer periphery of the tire alongside the rear edge of the tire tread so as to overhang the tread of the tire and thus prevent lateral displacement of the cover on the tire, said side plate portion being of such circumferential length as to substantially cover the exposed outer side wall of the tire on the automobile.

Signed at Asbury Park, N. J., this 4th day of June, 1929.

GEORGE ALBERT LYON.